Dec. 18, 1928.

A. D. ROBBINS 1,695,296

DRIVE FOR MOTOR VEHICLES

Filed Feb. 11, 1925

Inventor
Azor D. Robbins
By his Attorneys
Redding, Greeley, O'Shea & Campbell

Patented Dec. 18, 1928.

1,695,296

UNITED STATES PATENT OFFICE.

ATOR D. ROBBINS, OF NEW YORK, N. Y., ASSIGNOR TO INTERNATIONAL MOTOR COMPANY, OF NEW YORK, N. Y., A CORPORATION OF DELAWARE.

DRIVE FOR MOTOR VEHICLES.

Application filed February 11, 1925. Serial No. 8,329.

This invention relates to drives for motor vehicles and more particularly to a disposition of the drive mechanism with respect to the rear or driving axle. In certain types of motor vehicles, such as busses it is desirable, if not essential, that the floor of the vehicle be disposed as close to the ground as possible in the interest of stability while at the same time the maximum area of floor space must be available in the interest of the accommodation of passengers. While the floors of busses have heretofore been disposed in close proximity to the axles of the vehicle in order to maintain the center of gravity of the load as near the ground as possible the drive mechanism and particularly the differential gearing contained within the housing formed with the rear axle has always necessitated a portion of the vehicle floor being offset upwardly to accommodate the same. Heretofore the location of the differential midway between the ends of the axle has necessitated a raised portion in the center of the floor of the vehicle which has interfered materially with the convenience of passengers in passing along a central aisle of the vehicle. In order to overcome this difficulty it has previously been proposed to arrange the differential to one side of the middle of the axle in order that the raised portion of the floor may come beneath one of the side seats. Such disposition of the differential has necessitated the positioning of the prime mover of the vehicle and the drive shaft therefrom upon one side of the vehicle. This arrangement has proved impractical from the standpoint of operation and effectiveness of the drive. The present invention seeks to obtain the advantages inherent in a disposition of the differential gearing beneath one side of the vehicle body in order that the raised portion may be formed in the floor beneath a seat while at the same time retaining the advantages of standard automotive practice in which the drive shaft from the engine is disposed in the longitudinal median plane of the vehicle. Accordingly a system of gearing and shafting is provided whereby the power from the centrally disposed drive shaft is transmitted to a differential for the live axle sections disposed at one side of the vehicle. More particularly a bevel pinion is carried on the end of the drive shaft and meshes with a bevel pinion carried with the end of a short shaft section disposed substantially parallel with the live axle sections, but forwardly thereof. At the opposite end of the short shaft section there is carried a spur gear operatively connected with the master gear of the differential. In order that the invention may be clearly understood and readily carried into effect the same will now be described more fully with reference to the accompanying drawing illustrating a preferred embodiment thereof in which:

Figure 1:
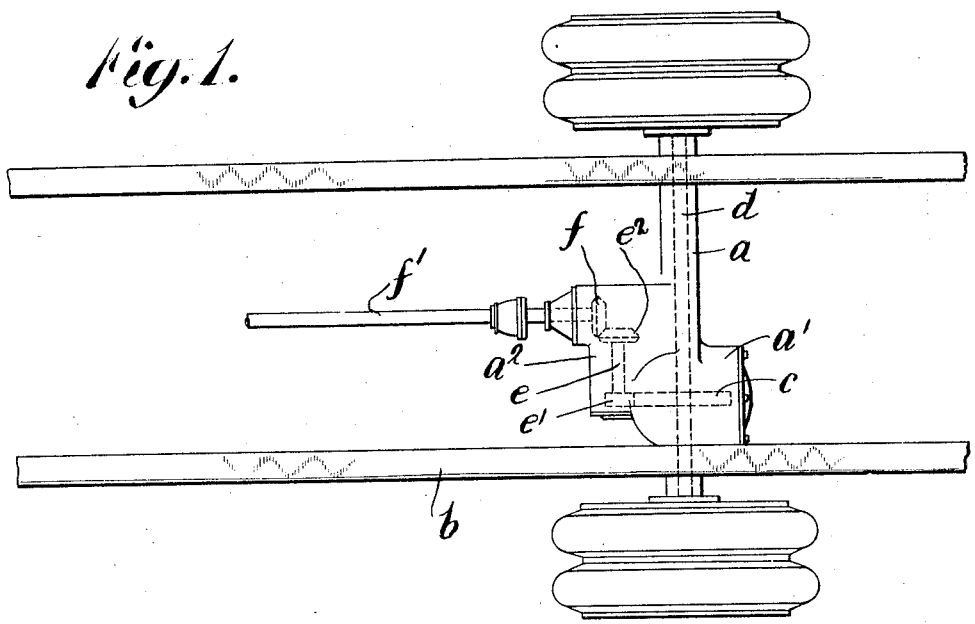
Figure 1 is a plan view showing so much of the rear end of a motor vehicle as is necessary to illustrate the disposition of the differential at one side of the mid-point of the axle and the centrally disposed drive shaft and the connections therebetween.
Figure 2:
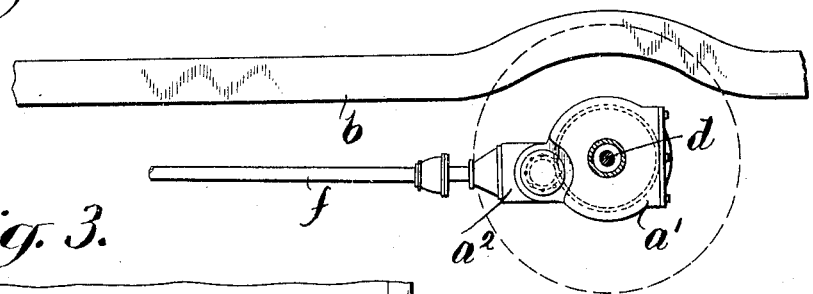
Figure 2 is a view in side elevation showing the drive shaft and differential gearing, one of the wheels of the vehicle being removed in the interest of clearness.

Referring to the drawings the rear axle housing $a$ is formed with a differential housing $a'$ disposed upon one side of the central axis of the vehicle and preferably adjacent a side member $b$ of the chassis frame. The differential mechanism is not illustrated in detail but the master gear thereof is indicated at $c$. Disposed forwardly of the live axle sections $d$ and substantially parallel thereto but so disposed that its axis is below the horizontal plane including the axis of the live axle is a short shaft section $e$ carrying on one end thereof a spur gear $e'$ which meshes with the master gear $c$ of the differential. The shaft $e$ is preferably journaled in suitable fashion in a housing portion $a^2$ formed forwardly of the dead axle $a$. Upon the end of the short shaft section $e$ opposite to that carrying the spur gear $e'$ and proximate to the longitudinal median line of the vehicle there is fixed a bevel pinion $e^2$ meshing with a bevel pinion $f$ carried upon the end of the drive shaft $f'$ driven in suitable manner from the prime mover of the vehicle (not shown). Suitable reduction in the drive may be realized by appropriately proportioning the spur gear $c'$ and the master gear $c$. Obviously, bevel gearing could be substituted for the spur gearing illustrated.

Figure 3:
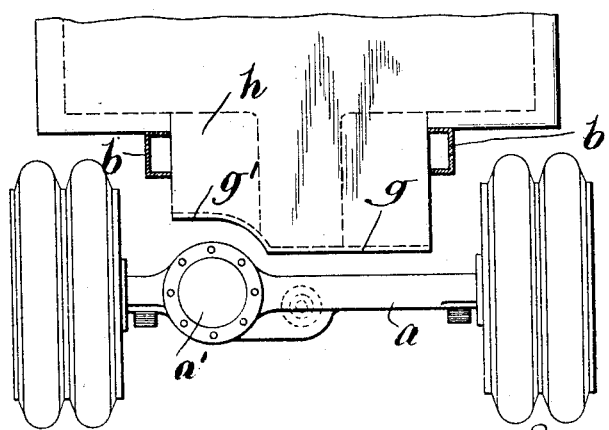
Figure 3 is a view in rear elevation showing the disposition of the differential with respect to the drive shaft of the vehicle and the manner in which the portion of the floor raised over the differential is disposed beneath a seat in the vehicle.

It will thus be seen that the differential gearing and gear case are offset from the longitudinal median line of the vehicle while the drive shaft from the engine is retained in the longitudinal median line as in accepted automotive practice. Referring to Figure 3 it will be noted that the floor $g$ of the vehicle supported from the side frame members of the chassis is disposed with little clearance above the rear axle $a$. A portion of the floor $g$ is offset in an upward direction to clear the differential housing $a'$ as clearly indicated in the drawings. Since the differential housing is offset from the longitudinal center line of the vehicle the offset portion $g'$ of the floor is disposed adjacent one side of the vehicle immediately beneath seats disposed along the sides of the body indicated at $h$.

The gearing and associated mechanism availed of to transmit driving torque from the drive shaft $f$ to the differential gearing may be varied dependent upon the results desired and no limitation is intended by the particular type of mechanism illustrated but the invention is to be deemed broadly covered in a manner commensurate in scope with the appended claims.

What I claim is:

1. In a drive for a motor vehicle having a central longitudinal aisle section and wherein the elements thereof are constructed to provide maximum clearance between the frame and axle, the combination of a drive shaft disposed in the median plane of the vehicle and extending rearwardly to the final drive thereof, live axle sections, differential gearing for the live axle sections at one side of the longitudinal median plane of the vehicle and out of the aisle section, a shaft section below the horizontal plane including the axis of the live axle sections and parallel thereto, and gearing connecting the shaft section with the drive shaft and differential gearing.

2. The combination as claimed in claim 1, wherein the live axle sections are carried with the side frame members, the differential being adjacent to one of said side frame members.

This specification signed this 30th day of January, A. D. 1925.

AZOR D. ROBBINS.